United States Patent [19]
Judson et al.

[11] 3,731,269

[45] May 1, 1973

[54] STATIC CORRECTIONS FOR SEISMIC TRACES BY CROSS-CORRELATION METHOD

[75] Inventors: Roger D. Judson, Houston, Tex.; John W. C. Sherwood, Whittier, Calif.

[73] Assignee: Chevron Research Company, San Francisco, Calif.

[22] Filed: Apr. 5, 1971

[21] Appl. No.: 134,099

Related U.S. Application Data

[63] Continuation of Ser. No. 848,061, Aug. 6, 1969, abandoned.

[52] U.S. Cl.................................340/15.5 CC, 340/15.5 TC, 340/15.5 DP
[51] Int. Cl. ...............................................G01v 1/36
[58] Field of Search ...............340/15.5 CC, 15.5 TC, 340/15.5 DP

[56] References Cited

UNITED STATES PATENTS

3,284,765  11/1966  Bratton ................................181/.5

Primary Examiner—Benjamin A. Borchelt
Assistant Examiner—N. Moskowitz
Attorney—A. L. Snow et al.

[57] ABSTRACT

A method is disclosed for determining source-to-datum corrections for a multitrace seismic cross-section. The method comprises the measurement of a multiplicity of cross-correlation functions between selected traces of the seismic section to establish a redundant set of simultaneous equations including the desired source-to-datum and geophone-to-datum quantities. The simultaneous equations are then solved for the desired corrections by the least squares error method. The method of the invention also provides for the determination of residual normal moveout corrections.

7 Claims, 9 Drawing Figures

INVENTORS
ROGER D. JUDSON
JOAN W. C. SHERWOOD

BY
ATTORNEYS

TRACE DESIGNATION DIAGRAM

FIG. 6

TRACE NEIGHBOR DIAGRAM

FIG. 7

INVENTORS
ROGER D. JUDSON
JOHN W. C. SHERWOOD

STATIC CORRECTIONS FOR SEISMIC TRACES BY CROSS-CORRELATION METHOD

The present application is a continuation of application Ser. No. 848,061, filed Aug. 6, 1969, and now abandoned.

FIELD OF INVENTION

The present invention relates to a novel method for correcting multitrace seismic records obtained according to conventional seismic prospecting methods. More particularly, the present invention relates to a method for determining the static corrections to be applied to traces of a multitrace record and further the best values for source-to-datum and geophone-to-datum corrections for each source and each geophone employed in producing the multitrace seismic record.

STATE OF THE ART

In seismic prospecting, elastic waves are created at or adjacent to the surface of the earth by several conventional means. These elastic waves are transmitted through the earth, and portions of such waves traverse downwardly through the earth and are reflected back to the earth's surface from the interfaces of subsurface strata. These reflected waves may be detected by placing geophones or seismic pickup devices on or adjacent the surface of the earth at points displaced from the origin of the seismic energy. The geophones convert the detected waves to equivalent electrical signals which are then amplified and recorded in a form known as a seismogram or seismic record. The seismic record consists of a plurality of traces aligned in parallel, each representative of the output of a geophone location.

Within this specification the term geophone will be used to identify a detecting location and a spread of geophones will be used to identify several detecting locations, each location being responsive for a separate trace of the record. In field practice several geophones may be connected as a group at each location with their combined signals being recorded as one trace from that geophone location.

It is conventional practice to record on a single seismic record the outputs from a 24 to 48 geophone spread spaced over distances up to 7,000 feet from the source of energy. The seismic record also generally includes an additional trace designating the instant at which the seismic energy was created, generally referred to as a "time break" trace, and one or more constant frequency timing signals which may be correlated with the significant events on the seismic traces to determine travel time from a selected reference time to each event. With this latter information, the seismic record can be examined to determine the time required for seismic energy to travel downwardly through the earth and be reflected back to the geophones.

Before a seismic record can be interpreted, it is generally necessary to correct each seismic trace to compensate for certain known errors in travel time and to correct the relative travel time relationship of a number of individual traces to correlate the same significant events appearing on each of a plurality of related traces. It is only by such correction and correlation of significant events that true travel times, true depth and attitude of subsurface strata can be ascertained. It has become standard practice to correct the data represented in each of the traces of the seismic record to a datum plane located generally near the surface of the earth formation being represented. The datum plane may be at any elevation; however, it is most usually established at an elevation somewhat below the depth of the seismic sources employed and below the weathered layers near the earth's surface.

One travel time correction which must be taken into account is that error caused by the transmission of seismic energy through the so-called low velocity or weathered layer of the earth. This weathered layer is the upper portion of the earth extending to depths as great as 50 to 100 feet and is composed of relatively unconsolidated matter. Accordingly, seismic energy travels at a relatively low velocity through the weathered layer. Therefore, in timing the transmission of seismic energy downwardly to a reflecting barrier and back to the surface of the earth, corrections must be applied for the additional time required for the energy to penetrate the weathered layer as compared with the time required to penetrate the higher velocity subsurface formations. This correction is commonly referred to as a weathering correction. For maximum accuracy in the presentation of seismic data, separate and different weathering corrections are desirably applied for each geophone on the surface spread.

A second correction which must be taken into account in determining travel time from seismic records, particularly significant in hilly or mountainous regions, is that error caused by differences in elevation of one geophone with respect to the other geophones. Obviously, a geophone located in a valley will detect seismic energy reflected from a given subsurface reflector at an earlier time than another geophone located at a higher elevation would detect energy reflected from the same reflector at the same distance from the source of energy. Therefore, in order to determine actual travel time of seismic energy reflected from a given reflector and to correlate reflections from this reflector from one trace to another, corrections must be applied to compensate for those differences in arrival times at the various geophones caused by differences in elevation. One method of compensating for this error caused by elevation is to express this error in terms of travel time and to adjust the position of the representation of the reflection on the trace to compensate for the error. As is the case with the weathering correction, a single travel time correction will apply to an individual trace, and that correction will be static over the entire length of each trace. In the same manner, the time correction for elevation may be different for each trace, being based upon individual source or geophone elevation. But, once established, the elevation correction will be static over the entire length of each trace. In the case of a dynamite source, the weathering portion of these errors is usually minimized because the source is usually placed within a shot hole drilled into the earth to penetrate to the bottom of the weathered layer. Weathering and elevation corrections still persist, however, and for maximum accuracy static source-to-datum time corrections should still be made.

Obviously, since both the weathering and elevation corrections, referred to above, will be static or nonvariable throughout the length of a single seismic trace, these two corrections, although determined separately, may be algebraically combined to form a single correction. These lumped or combined weathering and elevation corrections are commonly referred to in the art as a "static" correction, and while they will be the same or nonvariable throughout the entire length of an individual seismic trace they will be different for each trace under consideration because different sources or geophones are usually involved for each trace.

The static corrections discussed thus far are not the only corrections that must be made in order for the travel times indicated on neighboring traces to represent vertical travel times into, and back out of, the earth. A so-called dynamic, or time-varying, correction, known as a "normal moveout" correction, is necessary to compensate for the effect of shot-to-geophone geometry on the travel time, before true depth information can be determined. It is general practice to employ a spread of geophones in order to obtain travel time or depth information for an extended vertical section of the earth. Different geophone-spacing patterns may be employed, but it is common practice to space geophones evenly along a straight line pointing toward the source of energy. As a result of this spacing, energy reflected from a single subsurface reflector will arrive at different geophones at different times since the paths from the source of energy to the reflector and back to the geophones are angular or slant ray paths of different total lengths. As the distance from the source of energy to each successive geophone is increased, energy reflected from a single horizontal subsurface reflector will necessarily follow successively longer paths and the measured travel time thereto will be successively greater. This difference in travel time is evident when observing side-by-side uncorrected traces, produced by side-by-side geophones, and the difference is known as "normal moveout."

If one were considering only a single reflector at a single depth within a formation, the application of the normal moveout corrections would be relatively simple, since one could add constant corrections to the previously discussed static corrections, and simply move each entire trace a distance equal to the total correction. However, in analyzing seismic information, one is always interested in determining the depth and attitude of reflectors located at various depths. The normal moveout correction for the early part of the record is maximum, gradually decreases throughout the record and approaches zero at infinite time or infinite depth. A different normal moveout correction must be applied to each seismic trace of a group of neighboring traces to compensate for the difference in spread or spacing of the geophones from the source of energy. The normal moveout correction can be calculated employing predetermined velocity and spread information.

It was formerly the practice in seismic prospecting first, to make the best dynamic corrections possible, using estimated seismic velocities, or preferably, estimated velocity-versus-depth functions, and then to plot the seismic traces side-by-side for visual inspection to determine evident misalignments of prominent events on neighboring traces. From these evident misalignments, static corrections could be estimated, and applied as whole trace shifts. Such correction was obviously dependent upon the experience of the interpreter, including his ability to recognize significant events due to a reflecting horizon from a complex set of individual traces, and the accuracy of the interpreter's application of the corrections; or, in essence, the ability of the interpreter to visualize and correlate significant events appearing on a plurality of individual traces and related groups of seismic records.

Recently human inspection of side-by-side traces has been supplemented, and even replaced, by machine determination of misalignment, for instance, by cross-correlation of traces. See U.S. Pat. No. 3,217,289, Elliott et al., for Signal Analysis. However, the prior art has not realized that the misalignments detectable by machine cross-correlation include not only the static corrections desired to be eliminated but also trace-to-trace variations representing true structural information that was desired to be preserved. The problem is to recognize and separate the desirable and undesirable parts of the trace-to-trace change of event alignment.

SUMMARY DESCRIPTION OF THE PRESENT INVENTION

The present invention comprises a method for recognizing and separating those desirable and undesirable parts of trace-to-trace change of event alignment. In an overall sense, the invention herein disclosed accomplishes this recognition and separation by taking into account not merely the event arrival time differences between neighboring traces, but also taking into account the reasonably expectable structural continuity of correlatable events over large numbers of traces that may consist of as many as two or three thousand seismic traces.

Explicit results of the method comprise not only the values of the static corrections that are desired to be applied to the traces of the record, but also values of residual dynamic corrections over and above those first applied to the various traces. The overall result is a markedly improved display of side-by-side seismic traces whose event arrival time differences represent true subsurface structural elevational differences.

Further objects and features of the present invention will be readily apparent to those skilled in the art from the specification and appended drawings illustrating a preferred embodiment wherein.

DETAILED DESCRIPTION OF PRESENT INVENTION

Figure 1:
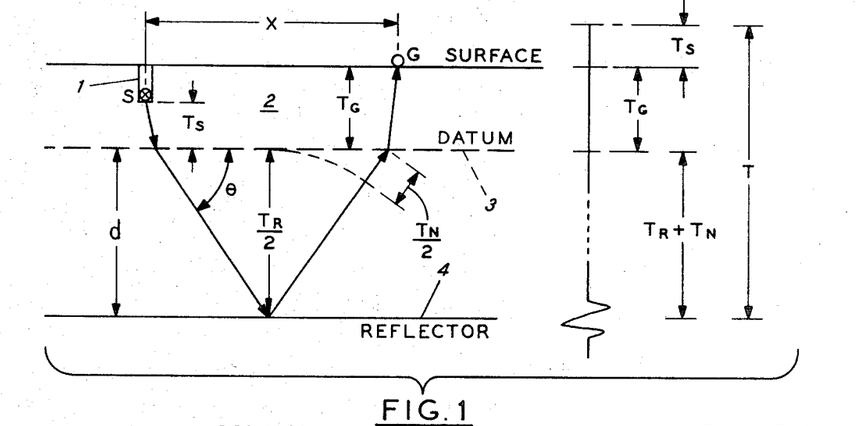
FIG. 1 is a schematic diagram illustrating a source, geophone and reflector is a cross-section of an earth formation and the associated time components along a seismic trace.

As schematically illustrated in FIG. 1, a source S is positioned at the bottom of a shot hole 1 drilled through the weathered layer of an earth formation 2. A geophone G is shown positioned at the surface of the formation. A datum plane 3 is illustrated below the surface, and a reflecting surface 4 is illustrated at a greater depth within the formation.

Alongside the cross-sectional representation is a simulated seismic trace indicating the recorded two-way travel time of energy from the source to the reflector and back to the geophone. The total time T represented on the seismic trace can be divided into time components associated with portions of the travel path within the formation:

$$T = T_S + T_G + T_R + T_N \quad (1)$$

where $T$ is the recorded time along the trace, $T_S$ is the time from shot to datum, $T_G$ is the time from geophone to datum, $T_R$ is the two-way travel time vertically from datum to reflector and back, and $T_N$ is the additional time from datum to reflector and return due to the horizontal distance, or "offset" between the shot and the geophone.

The form of equation (1) is not a useful one for determining the quantities $T_S$ and $T_G$, but it does serve well to indicate the essence of the problem, which is that each measured time on a seismic record is composed of at least four components, intimately associated, and not separable in any obvious way. It is desired, of course, to separate and to use the quantity $T_R$ whose variation along the line of seismic survey indicates the sought underground structural depth variation.

Prior art attempts—e.g., U.S. Pat. No. 3,217,289, Elliott et al.—at determining the static corrections for $T_S$ and $T_G$ by cross-correlating neighboring traces and observing the measured cross-correlation time lags have suffered from an inability to separate the variation of the four different kinds of time components indicated in equation (1). The present method overcomes that difficulty partly by making a greater number of cross-correlation measurements than it was heretofore possible to use, and partly by using a novel kind of constraint on the variation of the $T_R$ and $T_N$ components. Then it uses the measured cross-correlation values in a very large number of equations, in which are represented all of the essential unknown quantities, so that a complete solution is obtained, and all of the four kinds of quantities indicated in equation (1) can be determined. In fact, the present method uses a great redundancy of equations to develop statistical reliability in the calculated results. A typical problem may involve about 8,000 measured cross-correlation values to be inserted in about 8,000 simultaneous equations containing 300 of the unknown $T_S$, $T_G$, $T_R$, and $T_N$ quantities.

It will be appreciated at this point that the method to be described must depend upon the availability of a large modern digital computer, for it is beyond human capability to solve 2,000 simultaneous equations. Indeed it would be beyond human capability even to sort, arrange, and convert the data representing the seismic traces, and the measured cross-correlation time lags between the many pairs of those traces into the equations to be solved, in a useful amount of elapsed time. Performance of the process by a human, or a group of humans, would be of the order of a thousand times too slow for practical use.

The following description will not, however, be in the detailed terms of any particular computer program, but will be in general geophysical and mathematical terms so as to enable anyone skilled in the geophysical art to prepare his own system of data collection and conversion that will suit his own circumstances.

It will be assumed in the following description that the overall subject of the operation is a "seismic section" consisting of at least several hundred seismic traces recorded at the seismic surveying facilities were moved progressively along a geographical "line of survey."

The method of finding the static corrections for each trace begins like prior art methods in several senses. An attempt is made by the best means available, using the best velocity estimates available, to make "dynamic" or "normal moveout" corrections. But even here, a slight difference enters. No matter how good the measured velocity data seem to be or how well founded are the necessary velocity estimates, it is always assumed that the normal moveout corrections have been imperfect, and that a "residual normal moveout correction" remains to be determined.

After the preliminary dynamic corrections are made, cross-correlations are made between many pairs of traces. There will be a thorough discussion later in this description of what particular pairs of traces are most advantageous to use in the cross-correlations; it would interrupt the line of thought at this point to go into the details of selection. At this point it should suffice to say that neighboring, and near-neighboring, traces of the seismic record are used, and that the cross-correlations are preferably made over a correlation interval of about 1 second in some portion of the neighboring traces that shows a relatively good event, with a relatively good signal-to-noise ratio, that will impart a relatively confident meaning to the cross-correlations. Conventionally, seismic traces are less than 10 seconds in duration and usually about 6 seconds. One possibility would be to cross correlate portions of traces between 2 and 3 seconds along the traces where a significant event is apparent.

The cross-correlation operations result in a large number of time lag values which must be stored for later use, and which are labeled for storage so as to indicate what pairs of traces they represent. For purpose of this specification, the cross-correlation time lags are conveniently represented by the notion $\Delta T_{ij}$, the cross-correlation time lag between the $i$th and the $j$th traces.

A fundamental assumption of the method is that each cross-correlation time lag between two traces represents the difference of eight quantities like those on the right hand side of equation (1). For the $i$th and $j$th traces, one then has a relationship like the following:

$$\Delta T_{ij} = T_{Sj} - T_{Si} + T_{Gj} - T_{Gi} + T_{Rj} - T_{Ri} + T_{Nj} - T_{Ni} \quad (2)$$

where the meanings of the quantities are same as those of equation (1) with the obvious added meanings of the trace subscripts.

A remark is appropriate regarding the equals sign of equation (2). Strictly, it should not be an equals sign because in all actual seismic work there is a noise component on the seismic traces that has characteristics of random noise, and it introduces unknown error into the cross-correlations. So, in the absence of an added term to represent noise error, the above expression would more properly be written as an approximation rather than an equation. However, later on in the method, error terms are added to all equations, whether or not they represent cross-correlations, and these general error terms comprehend the known random noise affecting the cross-correlation time lags.

One of the novel features of the present invention is a physically-reasonable way of constraining the variation of the quantities $T_R$, and $T_N$, so that most of those unknown quantities will be expressed in terms of fewer reference unknown values across the seismic record. In fact, the number of $T_R$ and $T_N$ unknowns may be reduced, for instance, by a factor of 10.

CONSTRAINING THE VARIATION OF THE REFLECTION TIME AND RESIDUAL NORMAL MOVEOUT COMPONENTS

The way of constraining the variations of the $T_R$ and $T_N$ components will now be described:

One known, of course, that whereas the source-to-datum corrections, $T_S$, and the geophone-to-datum corrections, $T_G$, may have quite erratic variations due to small surface irregularities having dimensions of the order of a few feet, the two-way travel times, $T_R$, and the residual normal moveout corrections, $T_N$, are quantities that depend on larger scale geological variations whose sensing involves unavoidable averaging-out of any possible short range variations. Indeed the $T_R$ variations that one is looking for in seismic exploration are those large scale variations over hundreds or thousands of feet that represent subsurface geological structures of large dimensions. So, considering for a moment only the quantity $T_R$, one knows that the significant changes in that quantity must occur only over large distances that would be measured in terms of many geophone spacing intervals. For practical usefulness, as well as procedural convenience, one may therefore assume that the quantity $T_R$ will be well enough known if it is determined at only one-tenth of the locations at depth that are represented by the geophone coverage, and the intermediate values of $T_R$ may be interpolated from those fewer determined values. For convenience, seismologists use the term "depth point" to denote a location sensed by a particular trace, the horizontal location of the depth point being approximately under the center point between the particular shot and the particular geophone that produced the particular trace. Using that term, the constraining procedure can be described as assuming that an independently different $T_R$ will be determined at say, every ten depth points, and that the values at the intermediate depth points will be determined by mathematical interpolation.

Experience has shown that for the mentioned interpolation, simple linear interpolation is adequate, so that most of the $T_R$ quantities in the many equations of the form of equation (2) may be replaced by interpolation values defined in terms of the reference unknown values of $T_R$ as indicated by equation (3):

$$T_R(a) = T_R(k) + a\,[T_R(k+1) - T_R(k)] \quad (3)$$

where "a" represents the fractional distance between the $k$th and the $(k+1)$th reference depth point locations. Whereas the form of equation (3) expresses the idea of the interpolation advantageously, the form that is most useful in the actual process is that of equation (4):

$$T_R(a) = [1-a]T_R(k) + aT_R(k+1) \quad (4)$$

which expresses the idea that the quantity $R_R(a)$, (representing the majority of all the many $T_R$'s) is replaced in the equations of the form of equation (2) by the fractional factor $[1-a]$ times a reference unknown $T_R(k)$ to its left, plus the complementary fractional factor $(a)$ times a reference unknown to its right. Of course, no substitution is made at the reference depth points $k$ and $(k+1)$. The values of $T_R$ at the reference depth points remain as unknowns in the equations of the form of equation (2), and all the intermediate $T_R$'s are assumed in advance to be known in terms of those reference unknowns.

It will be evident to those skilled in seismic data processing that the quantities denoted by a "a" in equations (3) and (4), which represent fractional distances between reference depth points, must be numerically calculated from estimated depth points horizontal coordinates, which have been in turn, calculated from the known surface coordinates of the seismic shots and geophones.

The immediately preceding description has dealt with the way of constraining the variation of the $T_R$ quantities. The immediately following description will deal with the way of constraining the variation of the $T_N$ quantities, which is similar except for a few added complications.

The basis for the treatment of the residual normal moveout quantity is a mathematical fact, well known to exploration seismologists, that even the simplest kind of normal moveout correction (when the subsurface wave velocity may be considered constant) is an even function of the shot-to-geophone offset, with terms containing all the even powers of offset; the second, the fourth, the sixth, etc. However, the terms of higher power are relatively small and it is usually sufficient for practical purposes to use no more than two terms, a second power term, and a fourth power term.

The $T_N$ quantities may be expressed as in equation (5):

$$T_N = U x^2 + V x^4 \quad (5)$$

where $x$ is the shot-to-geophone offset and $U$ and $V$ are unknown coefficients to be determined by the process. In seismic work in which large depth intervals are concerned, the coefficients $U$ and $V$ must be recognized to vary with time on the seismic record. However, because all the steps of the present invention usually occur after a preliminary normal moveout removal, it is reasonable to consider $U$ and $V$ as average values over the entire correlation interval.

The unknown residual normal moveout quantities, $T_N$, in all the equations of the form of equation (2) are replaced with functions of offset of the form of equation (5), but before they are replaced, the number of unknown coefficients, U and V may be reduced in a manner similar to that used on the quantities $T_R$. In order to recognize, the account for, the possible variation of the coefficients U and V over large distance intervals, but still to constrain that variation over short distances, the individual unknown coefficients U and V are replaced by a fewer number of reference unknown U's and V's. Without repeating all of the reasoning preceding the writing of equation (4) one may write down directly a corresponding equation (6) involving the U and V coefficients:

$$T_N(a) = [1-a] [U(k) x^2 + V(k) x^4] \quad (6)$$
$$+ a [U(k+1) x^2 + V(k+1) x^4]$$

where the quantities have meanings corresponding to those in equation (4), the corresponding necessary changes of variables having been made.

Equation (6) represents the operation of replacing most of the unknown coefficients in the residual normal moveout terms of equations of the form of equation (2) by linear combinations of reference unknowns to their left and right.

It is to be understood that before terms of the sort represented by equation (6) are introduced into the many equations of the form of equation (2), the $x^2$ and $x^4$ quantities have been calculated from the coordinates of the respective shots and geophones corresponding to the concerned traces, and that after their calculation, those $x^2$ and $x^4$ quantities have been calculated from the coordinates of the respective shots and geophones corresponding to the concerned traces, and that after their calculation, those $x^2$ and $x^4$ quantities are merely known, numerical constants.

Up to this point, the method of the present invention will have resulted in a large multiplicity of simultaneous linear equations in four types of unknowns, as represented by equation (2), and the variation of the reflection time components and the residual normal moveout components will have been constrained in accordance with relationships of the sorts represented by equation (4) and (6). There is one more type of constraint essential to the method of the invention, but its introduction involves the use of an error quantity to be minimized, and it seems appropriate to defer the description of that specific constraint until the end of a broader description of the addition of minimizable error quantities to the entire ensemble of equations produced by the operations described thus far.

HANDLING OF REDUNDANT EQUATIONS

The already described variation constraints will have reduced the number of reflection time unknowns and residual moveout unknowns so much that if several intertrace cross-correlations are performed per trace, the number of known cross-correlation times, and consequently the number of possible linear equations in the unknowns, will greatly exceed the number of the unknowns themselves. There may be, for instance, a few hundred unknowns represented in literally thousands of equations. As is well known mathematically, it is possible to have a set of linear equations such that no set of values for the unknowns will satisfy all of the equations. In particular, in a real situation where the number of equations is much greater than the number of unknowns and where the coefficients of the linear equations result from actual physical measurements that are subject to experimental errors, there is a negligible probability that there exists a set of values for the unknowns which will satisfy all the equations.

The problem of dealing with a redundant set of linear equations has arisen in other branches of technology, notably in spectorscropy, and it has been discussed, for example, by G. P. Barnard ("Modern Mass Spectrometry," The Institute of Physics (London) 1953, pp. 214–230). There is no universally applicable answer to the question of what is the best way to solve a redundant set of linear equations. Some methods of solutions attempt to find the "best" non-redundant subset of the redundant set, but as Barnard states, "it is reasonable to suppose that the 'most accurate' solution would use all the given data"; and Barnard goes on to describe "the least squares method" for using all the equations simultaneously by transforming all the members of the redundant set into a non-redundant set whose solution may not satisfy any of the original equations exactly, but satisfies all of them within a desirable least squares approximation. (ibid., pp. 220–223). For purposes of the present specification, it should suffice to say that the least squares method amounts to adding an individual error quantity (usually denoted by an epsilon) to the right side of each of the original equations of the redundant set, one epsilon for each equation. Then the condition is expressed that the sum of the squares of all the individual epsilons is to be a minimum. This condition leads, through the differentiation of all the original equations with respect to each of the original unknowns, to a new set of linear equations, one and only one for each unknown. These new equations are usually called "normal equations." For these normal equations, it is always possible to obtain a solution which satisfies all the equations. In addition, if the physical problem has been well posed, this solution will be unique and is the nearest approach to satisfying all of the original equations.

In the least squares method, the values of the individual error terms for the individual original equations can be calculated, as well as the values of the originally sought unknowns. These error terms are the individual amounts by which the individual equations of the original redundant set are not satisfied by their common solution.

A valuable feature of the least squares method is that it permits "weighting" of the individual equations of the redundant set according to their known, or presumed relative reliabilities. Instead of minimizing just the squares of the above-mentioned epsilons, one minimizes the squares of those epsilons first multiplied by factors expressing the relative reliability of their respective equations. Barnard (ibid pp. 221–223) discusses this feature in spectroscopic terms, and the modifications of his prescription that are necessary for the seismic case are obvious. One measure of reliability will be apparent when considering the cross correlation of two traces that produces a cross-correlation time lag of a certain value and yet the correlation or similarity between the traces is exceedingly poor as represented, for instance, by the amplitude of the central peak of the cross-correlation function. The equation expressing that cross-correlation should be appropriately de-emphasized. The weights assigned to the error quantities can be, for instances, inversely proportional to the reliabilities.

CONSTRAINING THE VARIATION OF THE SOURCE-TO-DATUM AND GEOPHONE-TO-DATUM COMPONENTS

Now that mention has been made of the least squares method of solving a redundant set of simultaneous linear equations, and mention has been made also of the weighting feature of the method, a conveniently brief description may be given of another constraint on the variation of the unknown seismic quantities that is an essential part of the present invention.

Up to this point, the individual source-to-datum corrections and geophone-to-datum correction terms of the equations of the form of equation (2) have been discussed as if they were pure unknowns, and they are, in the sense that no reasoning can be applied to them about their expected smoothness of variation as was applied to the reflection-time and residual normal moveout quantities. However, it is possible to make preliminary field estimates of the $T_S$ and $T_G$ quantities from the field established, or field measured, vertical coordinates of the respective shots and geophones and from the estimated subsurface velocities in the weathered layer and the estimated thicknesses of the weathered layer. Indeed, this is all that was done, and all that could be done, toward the solution of the entire static correction problem, in early seismic exploration work. In the method of the present invention, however, the preliminary estimated $T_S$ and $T_G$ quantities are introduced into the large set of equations as a set of auxiliary equations of the simple form:

$$T_{Si} = T_{Si}(\text{est.}) + \epsilon_{Si} \quad (7)$$

$$T_{Gi} = T_{Gi}(\text{est.}) + \epsilon_{Gi} \quad (8)$$

where the epsilons represent unknown errors in the field estimated quantities, which like the epsilon error quantities already mentioned, may be weighted according to known or presumed confidence levels. Mathematically, the equations of the form of equations (7) and (8) are really another kind of constraint, this time on the variation of the $T_S$ and $T_G$ quantities. It can be shown that if equations like (7) and (8) are not used, the $T_S$ and $T_G$ quantities may turn out to be ambiguous in the sense of having unknown additive (or subtractive) constants, and the large matrix of the entire set of equations may turn out to be singular. It is, therefore, essential to constrain the variation of the $T_S$ and $T_G$ components by the introduction of the preliminary field-measured and filed-estimated values plus error quantities to be minimized.

ADDITIONAL COMMENTS ON CHOOSING AND CONDITIONING THE VARIABLES

The foregoing description contains the essential prescription that a person skilled in the art of seismic data processing would need in order to set up and carry out the method of the present invention. The following portions of the specification contain additional description and comments that may aid in practical utilization of the method.

There is one final condition that needs to be placed upon the previously described equations in order for them to be solvable. It is not a proper part of one of the major steps of the present invention. It is rather a condition that might be obvious in advance to one skilled in the art of solving sets of simultaneous equations or if not, would become obvious after a few unsuccessful attempts at solving a set of equations produced by the steps of this invention. The condition is that one of the unknown $T_R$'s should be temporarily fixed at an arbitrary value during the solution for the $T_g$'s and $T_S$'s. The mathematical reason for this is that all of the equations of the form of equation (2) contain only differences of the $T_R$ quantities, and the equations could therefore be satisfied by an infinite number of values of the $T_R$ quantities differing by additive constants. The fixing of just one $T_R$ stabilizes the whole system of equations.

It should be appreciated that a large digital computer of the capacity, for instance, of one in the IBM 360 series, will be required for handling not only the final solution of the several hundred simultaneous normal equations, but also for forming those equations out of the original correlation equations of the form of equation (2). If the original correlation equations are thought of in a conventional way, as a large, redundant set of simultaneous linear equations with their known coefficients and their unknowns on the left side, and their known constant terms on the right side (reversed order with respect to equation (2)) then the normal equations may be thought of as a set of simultaneous linear equations that is, to be sure, less numerous, because it is now reduced in number down to the number of unknowns, but having much more complicated coefficients. In fact, if one follows through the least squares method as prescribed by Barnard (loc. cit.) one finds that each new coefficient on the left hand side of the normal equations must be the sum of a large number of squares and cross products of the old coefficients; and even the right hand side constants of the set of normal equations will be composed out of both the old constants and the old coefficients. The work involved in sorting the old coefficients and forming the new coefficient and constant terms from them is far beyond human capability to perform within an elapsed time interval of any utility.

TRACES TO BE CROSS-CORRELATED

Although the applicability of the method of the present invention is not restricted to the kind of seismic surveying now widely known as "common-depth-point-stacking" it does have particular usefulness in processing the data from that kind of surveying. It seems appropriate, therefore, to mention some particular considerations on what types of trace-pairs are advantageously cross-correlated when processing common-depth-point-stacking (CDPS) data.

Figure 2:
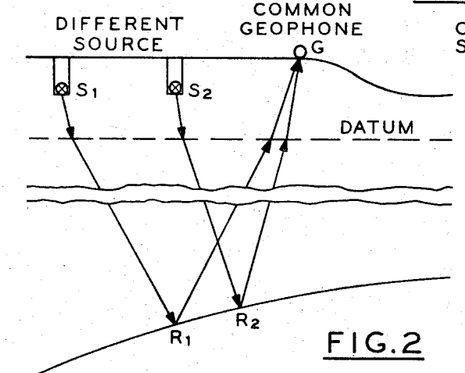
FIG. 2 represents a cross-sectional view of an earth formation and a typical seismic prospecting arrangement wherein a common geophone will produce two separate traces in response to the separate energization of a source at two different times and at two different source locations.
Figure 3:
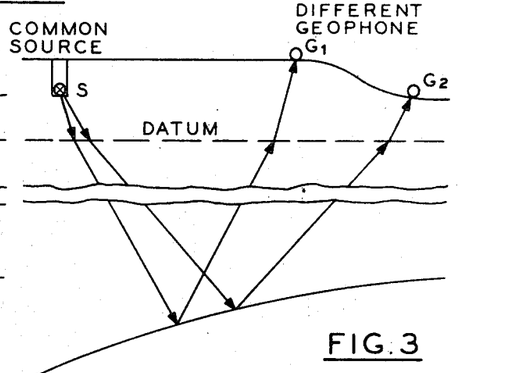
FIG. 3 represents the same cross-section of the earth formation wherein two geophones produce one trace each in response to the energization of a common source.
Figure 4:
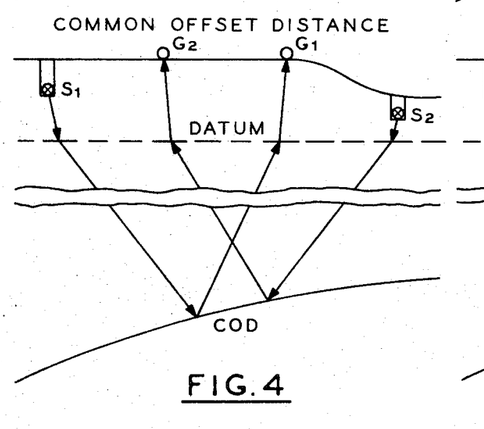
FIG. 4 represents the same cross-section of the earth formation wherein a pair of sources and a pair of geophones are employed to produce one trace from each geophone, the source-geophone spacings being such that there is a common offset distance for the two traces.
Figure 5:
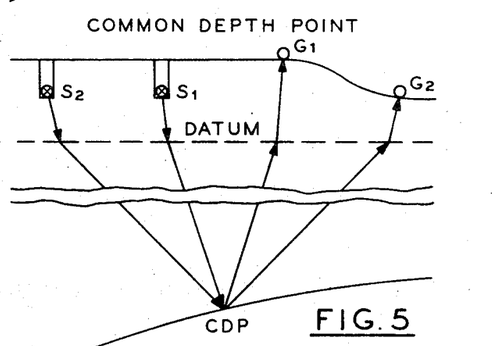
FIG. 5 represents the same cross-section of the earth formation wherein a pair of sources and a pair of geophones are employed to produce one trace from each geophone, the source-geophone spacing being such that the energy reflected to the geophones is reflected from a substantially common subsurface depth point.
Figure 6:
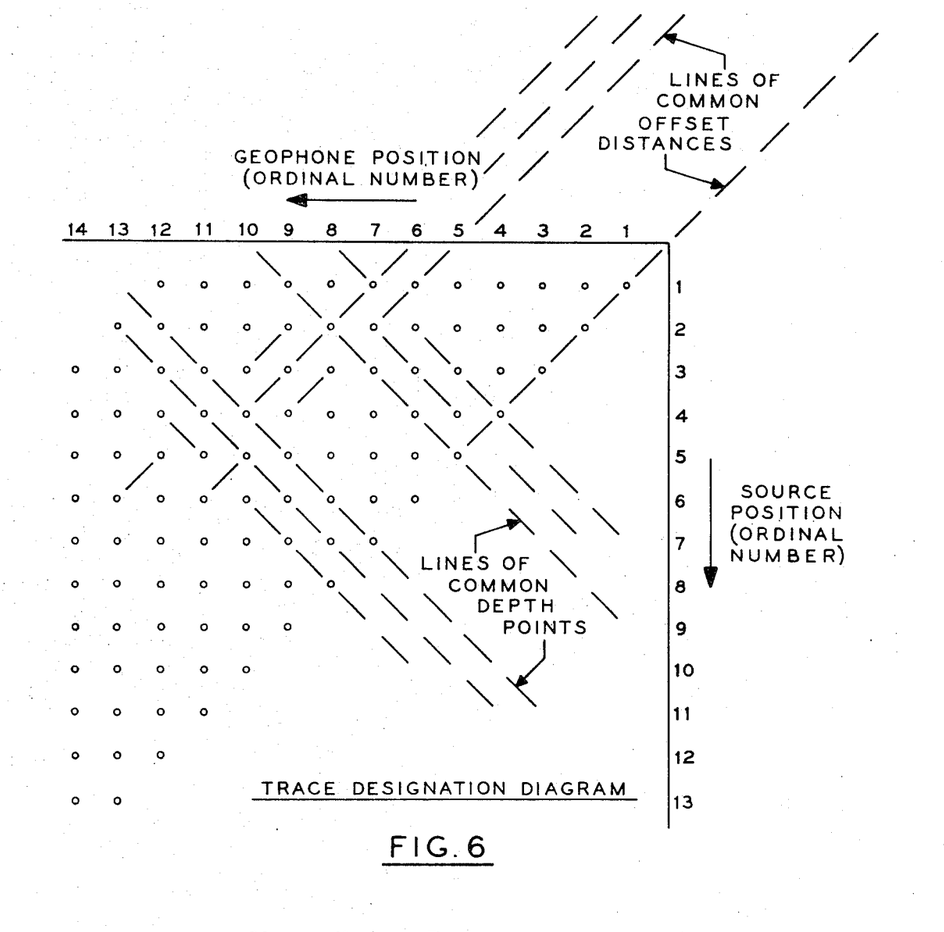
FIG. 6 is a trace designation diagram in chart form indicating the geophone and source combinations to produce any particular trace.
Figure 7:
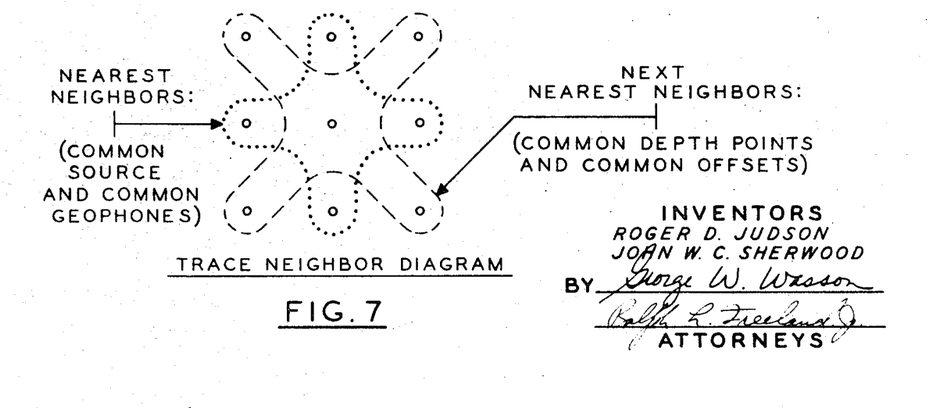
FIG. 7 is an isolated portion of a trace designation diagram indicating trace neighbors for cross-correlation purposes.

In CDPS, the geophone spreads are not picked up en masse and set down in a whole new set of locations after each shot. Rather, only one or two geophones at a time, out of a whole line, are moved for example from the rear end of the line to the forward end of the line. Most of the geophones retain the positions they had for the preceding shot. The scheme of geophone placement changes with progressive shots and may be conveniently represented on a "trace designation diagram" such as shown in FIG. 6. The horizontal dimension of the diagram may be thought of as a spatial dimension along the line of the survey, but the vertical dimension is not a corresponding perpendicular spatial dimension, it represents shot ordinal number, and the individual points on the diagram represent individual seismic traces produced in the CDPS process. It is therefore possible to designate which trace-pairs from a CDPS survey may advantageously be cross-correlated by associating particular pairs of the points on such a trace designation diagram. The intuitively-reasonable idea of cross-correlating geographically neighboring traces can be extended to justify the cross-correlation of neighbors, and near-neighbors, on such a trace designation diagram. FIG. 7 shows eight neighboring points extracted from the main diagram of FIG. 6. It will be merely stated here, without any further detailed justification, which trace-pairs are advantageously cross-correlated. The types of trace pairs are, in possible (but not necessary) order of importance:

a. trace-pairs as shown in FIG. 2 that represent common geophones, but different sources (such as vertical near neighbors in FIG. 7)
b. trace-pairs as shown in FIG. 3 that represent common sources, but different geophones (such as horizontal near neighbors in FIG. 7)
c. trace-pairs as shown in FIG. 4 that represent common offset distances (such as southwest to northwest next-to-nearest neighbors in FIG. 7)
d. trace pairs as shown in FIG. 5 that represent common depth points (such as northwest to southwest next-to-nearest neighbors in FIG. 7)

Another useful group of trace-pairs, among the not-quite-so-near neighbors not attempted to be represented in the neighbor diagram is the set of:

e. trace pairs having mirror symmetry about the zero offset axis (traces which have "reverse time paths," i.e., their source and geophone positions are interchanged).

As one progresses over the trace designation diagram, selecting trace pairs to be used, two overall requirements are important: (1) the progressive sets must overlap, and (2) various directions in the trace designation diagram must be sampled.

Figure 8:
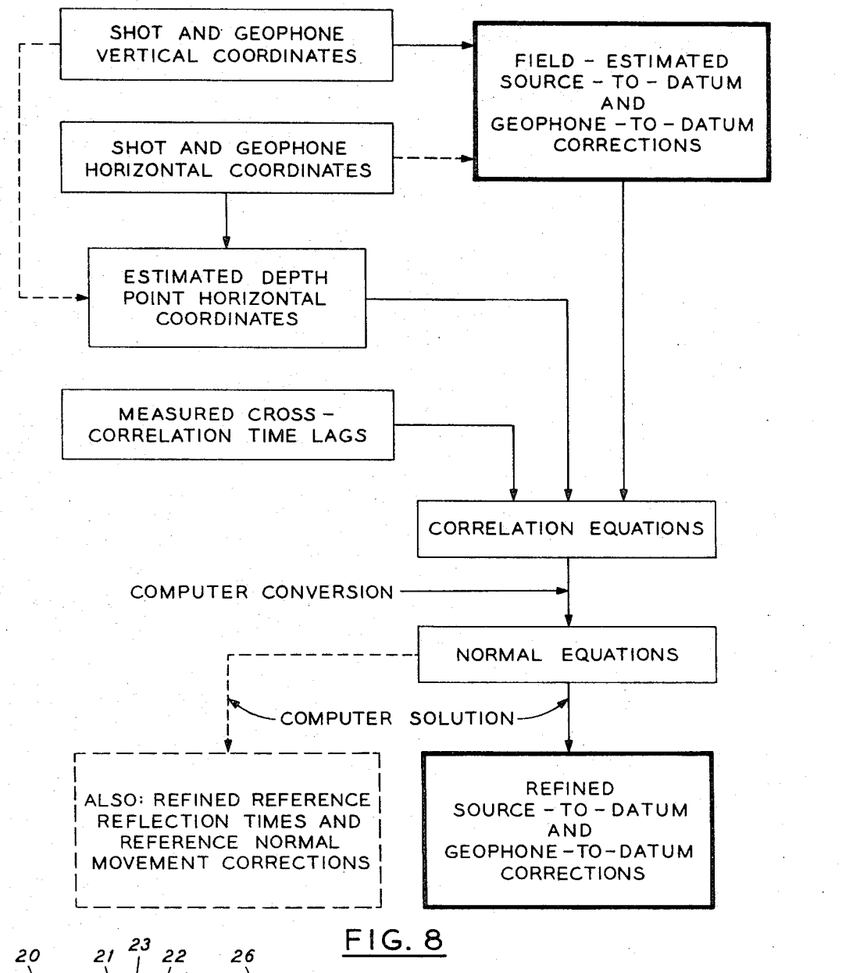
FIG. 8 is a block diagram flow chart of the coordination of physical measurements and mathematical processes embodied in the determination of the desired corrections and times in accordance with the present invention.

The foregoing description has dealt with so many individual physical quantities, and so many of their individual relationships to each other that their over-all relationships may have seemed obscured at times. FIG. 8 represents in a flow-diagram the entire process of the present invention, showing the kinds of physical quantities that go into the process and the kinds that come out. The relatively important flow relationships are represented by solid arrows. The relatively unimportant (not always necessary) relationships are represented by dotted arrows. The diagram is intended to speak for itself, both as a summary, and as a possible guide for review of separate parts of the foregoing specification.

In accordance with the present invention the desired source-to-datum and geophone-to-datum corrections are determined in the logic and computer process as illustrated in FIG. 8. As there illustrated, the vertical and horizontal coordinates of the shots and geophones employed in producing the original seismic record are employed as initial data to determine field estimates of source-to-datum and geophone-to-datum corrections and as input data to produce determinations of depth point horizontal coordinates. At the same time a predetermined grouping of pairs of original record traces are cross correlated to produce a measured cross correlation time lag for each cross correlation. These corrections, coordinates and measured time lags are used to set up and arrange the correlation equations as previously described to produce the redundant set of linear equations including the unknwon quantities of $T_G$, $T_S$, $T_N$ and $T_R$ and their error expressions.

The redundant set of equations are then converted to fewer equations with the aid of a properly programmed computer employing the processes known for determining the least squares error solutions by producing an appropriate set of normal equations including one equation for each unknown. The normal equations are then solved for the unknowns and the source-to-datum and geophone-to-datum determinations are used as time adjustments for producing the corrected record.

Figure 9:
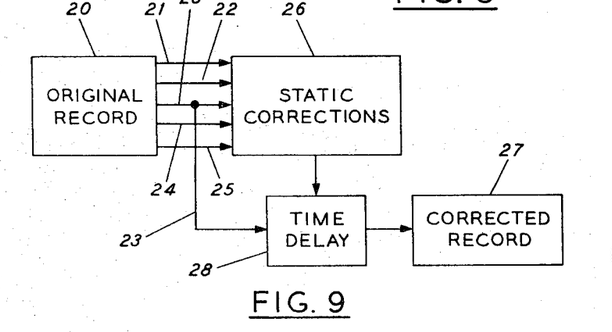
FIG. 9 is a block diagram of the actual process performed in accordance with the present invention.

FIG. 9 illustrates the use to which the determined corrections are to be put. As there illustrated in block diagram form, a group of traces 21, 22, 23, 24 and 25 from an original seismic record reproducer 20 are supplied to a static correction calculator 26 constituting the elements and computer described with respect to FIG. 8. One trace 23 is supplied to a recording device 27 for producing a corrected record through a time delay device 28. Calculated source-to-datum and geophone-to-datum time corrections from calculator 26 are supplied as plus or minus time intervals to the time delay 28 where the original trace is advanced or delayed accordingly. The corrected trace is then supplied to the recording device 27 for recording as a trace of the corrected record.

If desired, the solutions for reflection time corrections and normal moveout corrections may be determined from the established normal equations. Furthermore, once having determined the several corrections and employed those corrections to produce the corrected record, the entire process may be repeated or iterated with the corrected record to assure that maximum accuracy has been attained in producing the desired corrections.

While certain preferred embodiments of the invention have been specifically disclosed, it should be understood that the invention is not limited thereto as many variations will be readily apparent to those skilled in the art and the invention is to be given its broadest possible interpretation within the terms of the following claims:

1. A method for determining the best values of static correction to be applied to each amplitude versus time trace of a multitrace seismic record representing the output amplitudes of spatially adjacent geophone locations, by determining the individual source-to-datum-plane and geophone-to-datum-plane corrections for each source and each geophone employed in a seismic survey, said method using intertrace cross-correlation time-lag measurements between a plurality of pairs of traces of said record, and taking account of the possibility that measured intertrace cross-correlation time-lag values between the correlated traces may be composed not only of source-to-datum-plane and geophone-to-datum-plane time components, but also, simultaneously, of time components due to subsurface structural reflection time variations between said correlated pairs of traces and time components due to residual normal moveout variations between said correlated pairs of traces, comprising the steps of:
  a. constraining said variations of the unknown structural reflection time components, and the unknown residual normal moveout time components by defining their individual unknown values respectively in terms of fewer reference unknown values,
  b. constraining the variation of at least some of said source-to-datum correction time components and some of said geophone-to-datum correction time components by the introduction of preliminary, field measured, and field estimated, source-to-datum-plane time values and geophone-to-datum-plane time values, both of said time values including error quantities to be minimized,
  c. generating a redundant set of simultaneous linear equations, corresponding to a redundant set of said cross-correlation time-lag measurements, whose unknowns are (i) said source-to-datum corrections, (ii) said geophone-to-datum corrections, (iii) said reference unknown structural reflection time components, and (iv) said reference unknown residual normal moveout time components,
  d. then solving said redundant set of linear equations for source-to-datum and geophone-to-datum corrections to be applied as said determined static corrections to each of said traces of said record, by minimizing the sum of the squares of the individual amounts by which the individual equations of said redundant set are not satisfied by their common solution.

2. The method of claim 1 wherein said trace pairs used for said intertrace cross-correlation time-lag measurements comprise traces selected from the classes:
  a. trace-pairs that represent common sources, but different geophones,
  b. trace-pairs that represent common geophones, but different sources,
  c. trace-pairs that represent common offset distances, and
  d. trace-pairs that represent common depth points.

3. The method of claim 1 wherein the value of one of said reference unknown structural reflection time components is fixed, and others of said reference unknown values are expressed in terms of said fixed unknown value.

4. The method of claim 1 wherein said cross-correlation time-lag values are weighted in accordance with their known reliability, and the solution of said redundant set of linear equations minimizes the sum of the weighted squares of the individual amounts by which the individual equations of said redundant set are not satisfied by their common solution.

5. The method of claim 1 wherein said solving in step (d) is accomplished by
  a. converting said redundant set of linear equations to their corresponding normal equations that will result in minimizing said error quantities,
  b. then, with the use of a high speed computer, solving said normal equations for said source-to-datum-plane and said geophone-to-datum-plane corrections for each source and geophone, respectively, employed in said seismic survey.

6. The method of claim 1 with the additional step of shifting each trace of said seismic record with respect to its original position on said seismic record in accordance with the determined source-to-datum-plane and geophone-to-datum-plane correction for the specific source and geophone employed in producing that trace.

7. A method for determining the static correction to be applied to each trace of a multitrace seismic record by determining the individual source-to-datum-plane and geophone-to-datum-plane corrections for each particular source and each particular geophone employed to produce said trace in said multitrace seismic record, said method using a multiplicity of intertrace cross-correlation time-lag measurements between selected pairs of traces in said record, and taking account of the possibility that measured intertrace cross-correlation time-lag values may be composed not only of source-to-datum-plane and geophone-to-datum-plane time components, but also, simultaneously, of time components due to subsurface structural reflection time variations between traces and time components due to residual normal moveout variations between traces, comprising the steps of:
  a. generating from said measured cross-correlation time-lag values, derived from pairs of cross-correlated traces, a redundant set of simultaneous linear equations including error quantities to be minimized, said set comprising one equation for each cross-correlation time-lag value and each equation containing a different set of said source-to-datum-plane time components, said geophone-to-datum-plane time components, said structural reflection time components and said residual normal moveout time components,
  b. then solving said redundant set of simultaneous linear equations, minimizing said error quantities by the least-squares-error method, for the individual source-to-datum-plane and geophone-to-datum-plane time components to be applied for the particular source and particular geophone employed in producing each of said cross-correlated traces, c. and shifting each trace on said record in accordance with its found particular source-to-datum-plane and geophone-to-datum-plane time components constituting said static correction for that trace.

* * * * *